(12) United States Patent
Naipawer, III et al.

(10) Patent No.: US 8,241,446 B2
(45) Date of Patent: *Aug. 14, 2012

(54) THERMOPLASTIC SINGLE PLY PROTECTIVE COVERING

(75) Inventors: Michael P. Naipawer, III, Bloomingdale, NJ (US); Anthony Ruffine, Morristown, NJ (US)

(73) Assignee: Building Materials Investment Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/030,483

(22) Filed: Feb. 18, 2011

(65) Prior Publication Data

US 2011/0139340 A1    Jun. 16, 2011

Related U.S. Application Data

(60) Division of application No. 11/054,991, filed on Feb. 10, 2005, now Pat. No. 7,914,868, which is a continuation-in-part of application No. 10/351,921, filed on Jan. 27, 2003, now Pat. No. 6,863,944.

(51) Int. Cl.
| | |
|---|---|
| *E04F 13/07* | (2006.01) |
| *B29C 65/48* | (2006.01) |
| *B29C 65/52* | (2006.01) |
| *B32B 37/12* | (2006.01) |
| *B32B 38/00* | (2006.01) |

(52) U.S. Cl. .......... 156/71; 156/249; 156/267; 156/289; 156/307.3; 156/307.7

(58) Field of Classification Search ............ 156/71, 156/184, 247, 249, 250, 267, 269, 289, 307.1, 156/307.3, 307.5, 307.7; 427/207.1, 208.4; 52/745.05, 745.06, 746.1, 746.11

See application file for complete search history.

(56) References Cited

U.S. PATENT DOCUMENTS

| 4,424,650 | A | * | 1/1984 | Van Note .................... 52/96 |
| 4,743,332 | A | * | 5/1988 | Black ......................... 156/359 |
| 4,780,350 | A | * | 10/1988 | O'Connor et al. ............ 428/109 |
| 4,897,293 | A | * | 1/1990 | Thessen ..................... 428/41.3 |
| 5,242,727 | A | * | 9/1993 | Briddell et al. .............. 428/40.6 |
| 7,914,868 | B2 | * | 3/2011 | Naipawer et al. ............ 428/40.1 |
| 2002/0173582 | A1 | * | 11/2002 | Schmidt ....................... 524/504 |

* cited by examiner

*Primary Examiner* — Sing P Chan

(74) *Attorney, Agent, or Firm* — Thompson Hine LLP

(57) ABSTRACT

Methods of making a single ply protective covering and of installing such a covering are disclosed. The method of making includes (a) providing a single ply thermoplastic roofing membrane, and (b) coating the single ply thermoplastic roofing membrane on its bottom surface with a 1-50 mil layer of a pressure sensitive adhesive mixture consisting essentially of polyisobutylene and at least one polymer comprising conjugated diene monomers. The method of installing includes (a) providing a single ply thermoplastic roofing membrane, (b) cutting the single ply thermoplastic roofing membrane to a selected size, (c) positioning the single ply thermoplastic roofing membrane on a portion of a roof, and (d) bonding the membrane to the roof.

19 Claims, No Drawings

THERMOPLASTIC SINGLE PLY PROTECTIVE COVERING

CROSS-REFERENCE TO RELATED U.S. PATENT APPLICATION

This application is a divisional of U.S. patent application Ser. No. 11/054,991, filed Feb. 10, 2005, now U.S. Pat. No. 7,914,868, which is a continuation-in-part of U.S. patent application Ser. No. 10/351,921, filed Jan. 27, 2003, now U.S. Pat. No. 6,863,944.

FIELD OF THE INVENTION

This invention pertains to single ply weather exposable coverings for roof decks and transport vehicles including cars, trucks, trains, ships and the like which covering is in the form of a sheet having improved roof attachment comprising a pressure sensitive, rubber based adhesive coating on its non-exposable undersurface.

BACKGROUND OF THE INVENTION

Conventional single ply roof coverings or membranes, in use since 1970, have experienced several problems involving ease of installation, poor light reflectivity resulting in higher energy costs, shrinkage resulting in seam failure, time consuming attachment, replacement and repair procedures, low tolerance of cold temperatures causing cracking and loss of flexibility and lower adhesive resistance to chemical attack. Conventional roofing employing single ply sheets of ethylene/propylene/butadiene (EPDM) copolymers have experienced leakage and seam failure due to membrane shrinkage. The introduction of seam tapes replacing adhesives have partially ameliorated this condition; however, the application of tapes is time consuming and encounters difficulties in repair and replacement. Single ply polyvinyl chloride (PVC)/plasticizer sheeting is presently more widely used for roofing since it offers several advantages over EPDM. For example, although more expensive, it is available in white or lightly tinted membranes for better light reflectivity, thereby realizing significant savings in energy costs. Also PVC possesses high resistance to a wide variety of potentially destructive chemicals. Notwithstanding these advantages, installation of PVC sheeting is associated with costly and time consuming heat-welded seams to insure watertight reliability. Moreover, in a few cases, problems with plasticizer migration has resulted in system failure. Sheeting of ethylene/propylene copolymer (TPO) and other thermoplastic olefin polymers have several advantages over the above including markedly reduced shrinkage, high reflectivity, good weatherability and improved impact and puncture resistance, thereby addressing and minimizing the prior causes of single ply roofing failure.

Various methods of attachment of the above sheeting to roofs have been used or proposed. These include mechanical fastening with screws and anchor plates through the membrane and into a roof deck; the ballasting of the membrane with rocks or alternative aggregates to hold the membrane in place and coating of both the substrate and the membrane with a contact adhesive, containing aromatic components, which requires extended curing time for the coated surfaces to bond. Additionally, the later method presents health hazards arising from noxious toluene or xylene fumes vaporized during the curing process.

Accordingly, it is an object of the present invention to overcome the above time consuming procedures and other deficiencies while retaining beneficial properties of single ply roofing including superior tear, peel and puncture resistance, low temperature tolerance to avoid cracking and resistance to chemical attack.

Another object is to provide a single ply roof covering which eliminates mechanical fastening, ballasting, heat welding, cure time and supplementary adhesive requiring time curing.

Still another object is to achieve ease of replacement or patching of a surface adhered to a single ply roofing element.

Yet another object is to provide improved single ply sheeting packaged in a continuous roll which is immediately ready for use after peeling off a silicone release backer strip.

These and other objects and advantages will become apparent from the following description and disclosure.

SUMMARY OF THE INVENTION

In one aspect, methods of making a single ply protective covering are disclosed. The methods include the steps of providing a single ply thermoplastic roofing membrane, and coating the single ply thermoplastic roofing membrane on its bottom surface with a 1-50 mil layer of a pressure sensitive adhesive mixture consisting essentially of polyisobutylene and at least one polymer comprising conjugated diene monomers.

In another aspect, methods of installing a single ply thermoplastic roofing membrane on a roof are disclosed. The methods include (a) providing a single ply thermoplastic roofing membrane coated on its bottom surface with a 1-50 mil layer of a pressure sensitive adhesive mixture consisting essentially of polyisobutylene and at least one polymer comprising conjugated diene monomers, (b) cutting the single ply thermoplastic roofing membrane to a selected size, (c) positioning the single ply thermoplastic roofing membrane on a portion of a roof, and (d) bonding the membrane to the roof.

DETAILED DESCRIPTION OF THE INVENTION

The invention comprises a single ply roofing sheet which includes any of those discussed above or any other single ply membrane useful as a covering for a roof deck or a vehicle of transportation. Representative examples of suitable membranes are thermoplastic polyolefins such as TPO, PVC, EPDM and other thermoplastic olefin polymers.

The membrane may include a scrim embedded in the thermoplastic polymer for added strength, except where greater pliability is desired for detailed application, e.g. around joints or flashing. The scrim is generally composed of polyester or other fibrous or woven material, e.g. nylon, Orlon fibers and the like.

Additionally, the reinforced or non-reinforced membrane can have an adhesive coating on its undersurface to provide a stronger bond between the adhesive and membrane layers. Suitable adhesive adsorbent sheets are composed of felt, fleece, or any other random or woven fibers of cellulosic or synthetic materials such as, for example, nylon or Orlon fibers.

The single ply sheet of the invention is attached to a roof substrate by means of a 1 to 50 mil undercoat layer, preferably a 3 to 30 mil undercoat layer, of a pressure sensitive, polymeric adhesive or an adhesive mixture which is coated on at least the outer margins of the undersurface edges of the thermoplastic membrane or adhesive adsorbent layer. Suitable pressure sensitive adhesives are those which bond without curing and include (a) pressure sensitive rubber-based thermoplastic polymers containing at least 25 wt. % butyl rubber blended with (b) poly(isobutylene) and (c) poly(butene) or mixtures of (a). Component (a) includes known thermoplastic rubbers such as SB, SBS, SIS, SEBS. The pressure sensitive adhesive mixture containing approximately equal amounts of butyl rubber, poly(isobutylene) having a number average molecular weight of from about 70,000 to about 400,000 and polybutene having a number average molecular weight of from about 700 to about 2,700 is preferred. Most desirable is a mixture containing between about 32-34 wt. % butyl rubber, e.g. EXXPRO, supplied by EXXON/MOBIL; between about 32-34 wt. % polyisobutylene, e.g. VISTANEX, also supplied by EXXON/MOBIL and between about 30-36 wt. % polybutene, e.g. INDOPOL, supplied by BP AMOCO. The adhesive mixture may additionally contain up to 3 wt. % of thinner, thickener or a viscosity modifier, depending on the weight of the membrane and climatic conditions associated with its use.

In an alternative embodiment, the suitable pressure sensitive adhesive consists essentially of polyisobutylene and at least one polymer comprising conjugated diene monomers. Exemplary conjugated diene monomers include, but are not limited to, 1,3-butadiene, 2-methyl-1,3-butadiene(isoprene), 2,3-dimethyl-1,3-butadiene, 1-phenyl-1,3-butadiene, 2-phenyl-1,3-butadiene, 1,3-pentadiene, 2-methyl-1,3-pentadiene, 1,3-hexadiene, 4,5-diethyl-1,3-octadiene, 3-butyl-1,3-octadiene and chloroprene, 2,3-di-tert-butyl-1,3-butadiene, 1,3,5-hexatriene, 1,3,5,7-octatetraene, and the similar related compounds.

The adhesive may also contain small amounts, less than about 5% antioxidant and/or a hydrocarbon or rubber tackifier, e.g. a $C_6$ to $C_{12}$, such as ESCOREVZ supplied by EXXON/MOBIL, or a plasticizer, anti-flow additive or UV stabilizer, or a mixture thereof. Furthermore, the pressure sensitive adhesive mixture contains up to about 25 wt % filler, such as $CaCO_3$ or $TiO_2$ or carbon black.

The thickness of the reinforced or non-reinforced single ply membrane, excluding coated adhesive layer, can vary between about 25 and about 90 mils, preferably between about 40 and about 65 mils. The overall thickness of the present pressure sensitive adhesive applied membrane is between about 45 and about 100 mils, most preferably between about 55 and about 75 mils.

The present membrane, when packaged as a continuous roll, is faced with kraft paper or a silicone treated release sheet covering the adhesive surface which release material is easily peeled off before installation on the roof. Installation of instant membrane is greatly simplified since it requires no mechanical fastening, no adhesive cure time, no ballast and no extraneous adhesive chemicals. The sheet is simply cut to size, the release sheet peeled away and the membrane positioned on the roof for immediate installation and instant bonding of membrane to the substrate while heat sealing any seams in the membrane structure.

The present improved single ply membrane exhibits superior puncture resistance of more than 250 lbf (pounds force); a tear strength of 124×140 lbf or more and a peel strength greater than 45 lbs. In addition, the membrane has good chemical resistance, while retaining a degree of flexibility at low and freezing temperatures. Further, the pressure adhesive coating allows the membrane to conform to substrate irregularities and various roof areas such as roof hips and valleys.

Having generally described the invention, reference is had to the following examples which illustrate preferred embodiments and comparisons with current single ply membranes; however, these examples are not to be construed as limiting to the scope of the invention as defined by the appended claims.

EXAMPLE 1

Equal parts of polyisobutylene of average molecular weight 100,000; polybutene of average molecular weight about 1,000 and thermoplastic styrene/butadiene/styrene polymer containing 30 wt. % butyl rubber are extruded into a mixing kettle and stirred at 220° C. for 0.5 hour to provide a spreadable pressure sensitive adhesive. The adhesive is coated on the undersurface of a single ply polyvinyl chloride membrane in a thickness of about 50 mils to provide a single ply roof deck covering having resistance to wind lift without the need for mechanical fastening.

EXAMPLE 2

The above procedure is repeated except that the single ply membrane is fortified with a glass mat scrim embedded in the membrane. The resulting product exhibits good resistance to wind lift when applied to a roof deck.

EXAMPLE 3

Example 1 is again repeated except that the single ply membrane has an undersurface adhesive-absorbing layer of felt fibers to increase the amount of pressure sensitive adhesive taken up in the coating step by the membrane to provide an adhesive undercoating of 75 mils. This product also exhibits excellent resistance to wind lift when installed on a roof deck.

Without departing from the scope of this invention, it will be understood that other pressure sensitive adhesive components can be substituted in whole or in part for the compositions disclosed herein, but, depending on their concentration, such substitutions are subject to one or more of the foregoing disadvantages discussed in the Background of the Invention. Such pressure sensitive substitution adhesives include acrylic polymers and polyurethanes.

What is claimed is:

1. A method of making a single ply protective covering, the method comprising:
   providing a single ply thermoplastic roofing membrane;
   coating the single ply thermoplastic roofing membrane on its bottom surface with a 1-50 mil layer of a pressure sensitive adhesive mixture consisting essentially of polyisobutylene and at least one polymer comprising conjugated diene monomers.

2. The method of claim 1 further comprising embedding a scrim in the single ply thermoplastic roofing membrane.

3. The method of claim 1 further comprising annealing an adhesive adsorbing layer to the bottom surface of the single ply thermoplastic roofing membrane before the coating of pressure sensitive adhesive is applied.

4. The method of claim 1 wherein the single ply thermoplastic roofing membrane includes a thermoplastic polyolefin.

5. The method of claim 1 wherein the pressure sensitive adhesive mixture contains up to about 3 wt. % of a thickener, thinner or a viscosity modifier.

6. The method of claim 1 wherein the pressure sensitive adhesive mixture contains up to about 5 wt. % of an antioxidant, rubber tackifier, a plasticizer, anti-flow additive, a UV stabilizer or a mixture thereof.

7. The method of claim 1 wherein the pressure sensitive adhesive mixture contains up to about 25 wt. % filler such as $CaCO_3$ or $TiO_2$ or carbon black.

8. The method of claim 1, wherein the polyisobutylene has a number average molecular weight from approximately 40,000 to 400,000.

9. The method of claim 1, wherein the free surface of the pressure sensitive adhesive is covered with kraft paper or a silicone treated release sheet and packaged as a roll.

10. The method of claim 1, wherein the conjugated diene monomers are selected from the group consisting of 1,3-butadiene, 2-methyl-1,3-butadiene(isoprene), 2,3-dimethyl-1,3-butadiene, 1-phenyl-1,3-butadiene, 2-phenyl-1,3-butadiene, 1,3-pentadiene, 2-methyl-1,3-pentadiene, 1,3-hexadiene, 4,5-diethyl-1,3-octadiene, 3-butyl-1,3-octadiene and chloroprene, 2,3-di-tert-butyl-1,3-butadiene, 1,3,5-hexatriene, and 1,3,5,7-octatetraene.

11. The method of claim 1 wherein the polyisobutylene and the at least one polymer comprising conjugated diene monomers are present in the pressure sensitive adhesive in equal parts.

12. The method of claim 1 further comprising:
mixing the polyisobutylene and the at least one polymer comprising conjugated diene monomers with heat into a spreadable pressure sensitive adhesive.

13. A method of installing a single ply thermoplastic roofing membrane on a roof, the method comprising the steps of:
(a) providing a single ply thermoplastic roofing membrane coated on its bottom surface with a 1-50 mil layer of a pressure sensitive adhesive mixture consisting essentially of polyisobutylene and at least one polymer comprising conjugated diene monomers;
(b) cutting the single ply thermoplastic roofing membrane to a selected size;
(c) positioning the single ply thermoplastic roofing membrane on a portion of a roof; and
(d) bonding the membrane to the roof.

14. The method of claim 13 wherein the pressure sensitive adhesive is covered with kraft paper or a silicone treated release sheet, and the method includes the steps of removing the kraft paper or silicone release sheet prior to bonding the membrane to the roof.

15. The method of claim 14 wherein the single ply thermoplastic roofing membrane is provided in the form of a roll.

16. The method of claim 13 further comprising heat sealing any seams in the resulting bonded roofing membrane.

17. The method of claim 13 wherein the single ply thermoplastic roofing membrane includes an adhesive absorbing layer annealed to the bottom surface of the membrane between the membrane and the pressure sensitive adhesive.

18. The method of claim 13 wherein the pressure sensitive adhesive mixture contains a thickener, a viscosity modifier, an antioxidant, a rubber tackifier, a plasticizer, an anti-flow additive, a UV stabilizer, a filler or mixtures thereof.

19. The method of claim 13 wherein the polyisobutylene and the at least one polymer comprising conjugated diene monomers are present in the pressure sensitive adhesive in equal parts.

* * * * *